July 3, 1923.

H. P. MOLANDER

CURRENT MOTOR

Original Filed Aug. 11, 1921  2 Sheets-Sheet 1

1,460,495

Inventor
Hans P. Molander
by Graham & Harris
Attorneys

July 3, 1923.
H. P. MOLANDER
CURRENT MOTOR
Original Filed Aug. 11, 1921   2 Sheets-Sheet 2
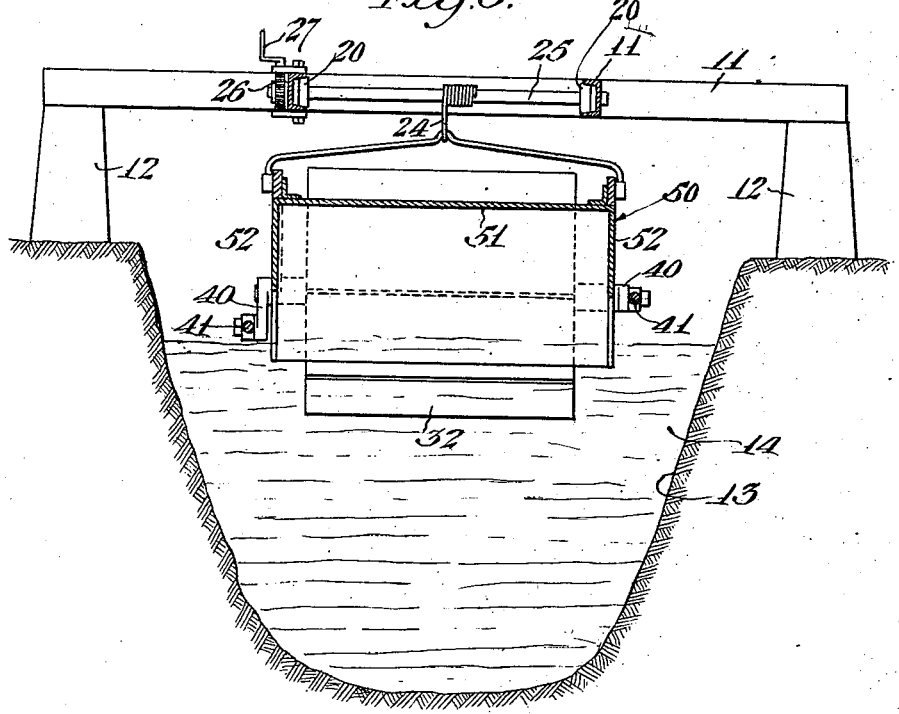
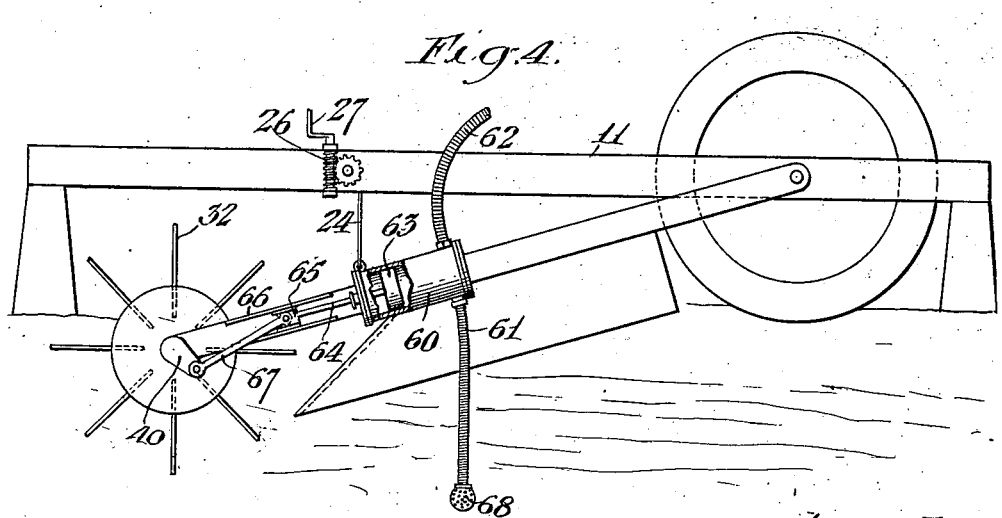
Inventor
Hans P. Molander
by Graham & Harris
Attorneys.

Patented July 3, 1923.

1,460,495

UNITED STATES PATENT OFFICE.

HANS P. MOLANDER, OF LONG BEACH, CALIFORNIA.

CURRENT MOTOR.

Application filed August 11, 1921, Serial No. 491,395. Renewed May 16, 1923.

*To all whom it may concern:*

Be it known that I, HANS P. MOLANDER, a citizen of the United States, residing at Long Beach, in the county of Los Angeles and State of California, have invented a new and useful Current Motor, of which the following is a specification.

My invention relates to motors which are adapted to utilize the force of moving bodies of water such as swiftly moving streams, contents of aqueducts, irrigation ditches and the like.

The principal object of my invention is to provide a very simple form of current motor which may be readily suspended over such a moving body of water and which may be utilized to pump this water or do other useful work.

Other objects and advantages will be made evident hereinafter.

Referring to the drawing which is for illustrative purposes only,

Fig. 4 is an alternate form of my invention adapted to pump water from a moving stream.

Fig. 5 is a sectional detail of construction.

Figure 1:
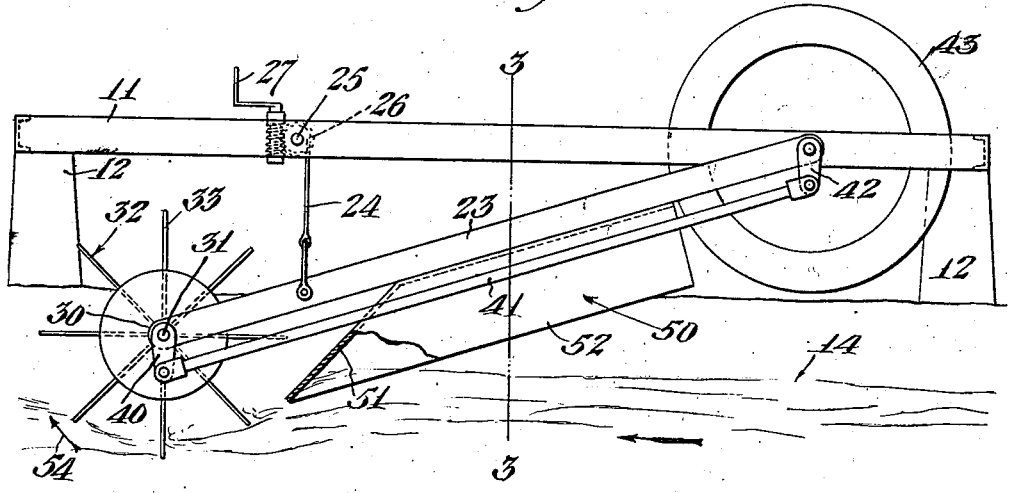
Fig. 1 is a side elevation of my invention as applied to the production of useful power.
Figure 2:
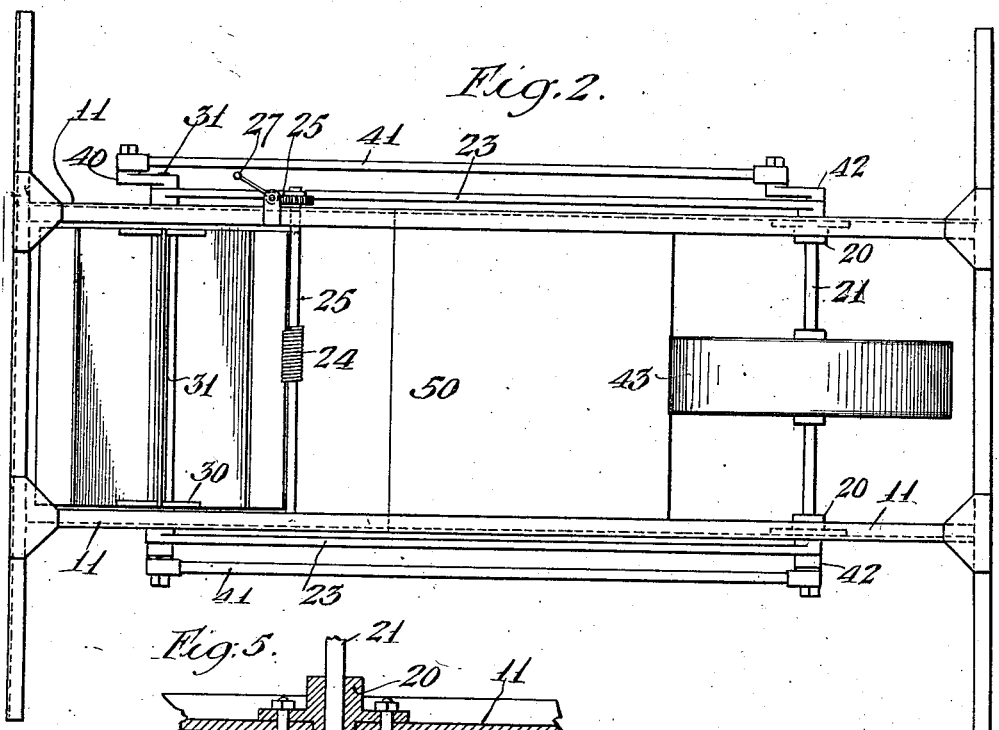
Fig. 2 is a plan view of same.
Figure 3:
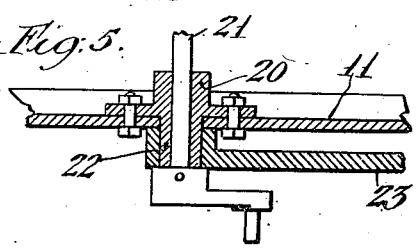
Fig. 3 is a section on a plane represented by the line 3—3 of Fig. 1.

In the form of my invention shown, a frame 11 is provided which may be supported on suitable posts 12 above a water channel 13 in which a moving stream of water 14 is flowing. Mounted in bearings 20 secured to the frame 11 is a shaft 21. The bearings 20 are provided with an external bearing surface 22 on each of which a swinging arm 23 is mounted, the lower end of these swinging arms being free to be raised up and down by means of a cable 24, a shaft 25 and a worm gear 26 operated by a crank 27. By using the worm gear I am able to raise and lower the swinging arms 23 and to leave them suspended in any position, the worm gear serving to lock the shaft 25 in any position.

Carried in bearings 30 at the lower end of the arm 23 is a shaft 31 having secured thereon a paddle wheel 32, the paddle wheel 32 having vanes 33 which may be of the form shown or which may be slightly curved, if desired. Cranks 40 are secured upon either end of the shaft 31, these cranks being connected through connecting rods 41 with cranks 42 carried on the shaft 21. A pulley 43 may be mounted on this shaft for the purpose of delivering useful power.

My invention resides especially in the current deflector 50 which is secured between the arms 23 and which consists of a curved plate 51 having side plates 52 fixed to either side thereof. The direction of the current is in the direction of the arrow shown in Fig. 1, the water flowing from right to left. The curved plate 51 serves to direct this water onto the periphery of the wheel, thus enabling its full velocity to be utilized both laterally against the vanes 33 and also upwardly as indicated by the arrow 54, as it rises in seeking the level of the stream, thereby providing a greater efficiency of operation than has heretofore been attained in such devices.

In the form of the invention shown in Fig. 4, I provide a pump cylinder 60 having an intake 61 and an outlet 62 provided with suitable valves, not shown. A piston 63 having a piston rod 64 is connected to a cross head 65 moving in suitable guides 66 and actuated through a connecting rod 67 from one of the cranks 40. The pipes 61 and 62 are preferably flexible, a strainer 68 being provided on the pipe 61 which dips beneath the surface of the stream 14 as the paddle wheel 32 revolves and actuates the piston 63 raises water through pipe 61 and delivers it through the pipe 62.

My invention has a special utility where it is desired to raise water from irrigation ditches or the like for domestic or irrigation purposes. By means of crank 27 the water wheel may be suspended at its most economical depth and it will thereafter deliver a constant supply of water through the pipe 62.

I claim as my invention:

1. A current motor comprising: a frame adapted to be fixed over a moving stream of water; two bearings concentric about a single axis, one bearing fixed to one side of said frame and the other bearing fixed to the other side of said frame; two swinging arms, one pivoted on one of said bearings and the other pivoted on the other of said bearings; a shaft situated at the free end of said swinging arms; bearings carried on said swinging arms, in which said shaft is free to turn; a paddle wheel turning about the axis of said shaft; and a current deflector carried between said arms and moving therewith and so shaped as to direct the force of said stream against the periphery of said wheel, said deflector consisting of a sheet of material extending entirely across the face of the wheel and having any transverse line therein parallel with the axis of the wheel.

2. A current motor comprising: a frame adapted to be fixed over a moving stream of water; two bearings concentric about a single axis, one bearing fixed to one side of said frame and the other bearing fixed to the other side of said frame; two swinging arms, one pivoted on one of said bearings and the other pivoted on the other of said bearings; a shaft situated at the free end of said swinging arms; bearings carried on said swinging arms, in which said shaft is free to turn; a paddle wheel turning about the axis of said shaft; and a curved imperforate current deflector carried between said arms and moving therewith and so shaped as to direct the force of said stream against the periphery of said wheel; said deflector consisting of a sheet of material extending entirely across the face of the wheel and having any transverse line therein parallel with the axis of the wheel.

3. A current motor comprising: a frame adapted to be fixed over a moving stream of water; two bearings concentric about a single axis, one bearing fixed to one side of said frame and the other bearing fixed to the other side of said frame; two swinging arms, one pivoted on one of said bearings and the other pivoted on the other of said bearings; a shaft situated at the free end of said swinging arms; bearings carried on said swinging arms, in which said shaft is free to turn; a paddle wheel turning about the axis of said shaft; a current deflector carried between said arms and moving therewith and so shaped as to direct the force of said stream against the periphery of said wheel; and side wings so placed as to confine said force within definite channels, said deflector consisting of a sheet of material extending entirely across the face of the wheel and having any transverse line therein parallel with the axis of the wheel.

4. A current motor comprising: a frame adapted to be fixed over a moving stream of water; two bearings concentric about a single axis, one bearing fixed to one side of said frame and the other bearing fixed to the other side of said frame; two swinging arms, one pivoted on one of said bearings and the other pivoted on the other of said bearings; a shaft situated at the free end of said swinging arms; bearings carried on said swinging arms in which said shaft is free to turn; a paddle wheel turning about the axis of said shaft; a curved imperforate current deflector carried between said arms and moving therewith and so shaped as to direct the force of said stream against the periphery of said wheel; and side wings so placed as to confine said force within definite channels, said deflector consisting of a sheet of material extending entirely across the face of the wheel and having any transverse line therein parallel with the axis of the wheel.

In testimony whereof, I have hereunto set my hand at Los Angeles, California, this 26th day of July, 1921.

HANS P. MOLANDER.